June 12, 1956     B. FOX     2,750,572
MULTI-CONTACT CONNECTOR
Filed April 29, 1953            3 Sheets-Sheet 1
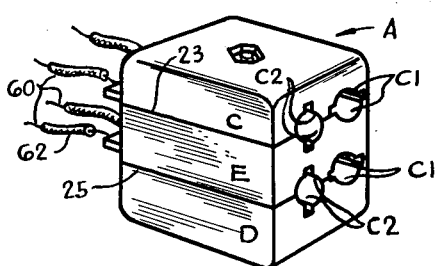
FIG.1
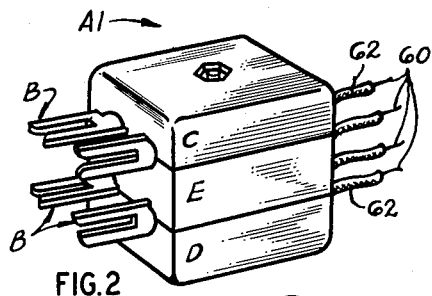
FIG.2
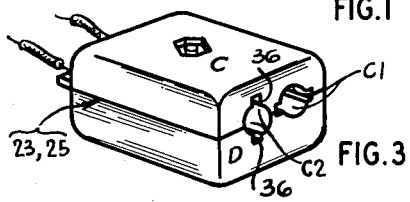
FIG.3
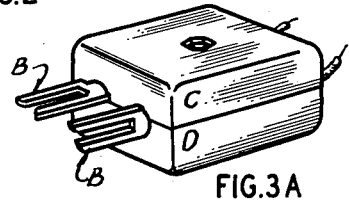
FIG.3A
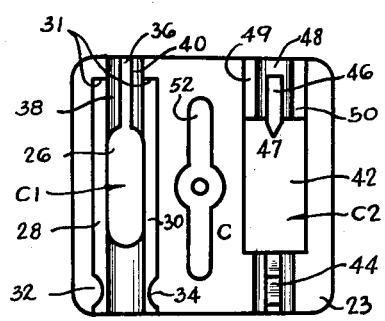
FIG.4
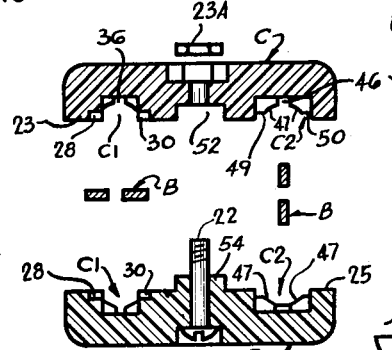
FIG.5
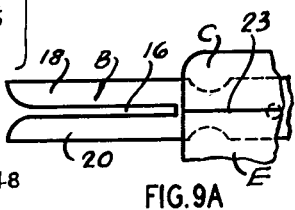
FIG.9A
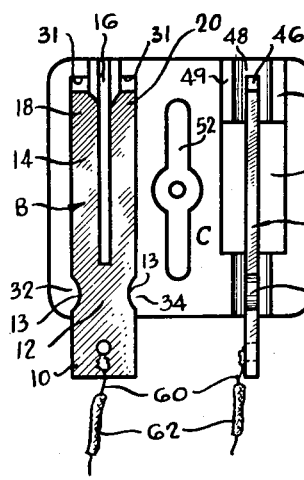
FIG.6
FIG.7
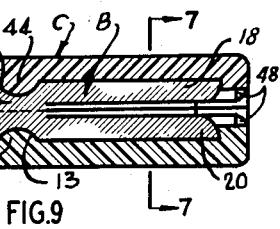
FIG.9
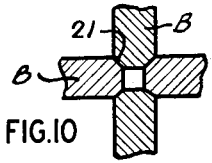
FIG.8
FIG.10
INVENTOR.
BENJAMIN FOX
BY Harry Sangsam
ATTORNEY June 12, 1956  B. FOX  2,750,572
MULTI-CONTACT CONNECTOR
Filed April 29, 1953  3 Sheets-Sheet 2

INVENTOR.
BENJAMIN FOX
BY
Harry Langsam
attorney

June 12, 1956  B. FOX  2,750,572
MULTI-CONTACT CONNECTOR

Filed April 29, 1953  3 Sheets-Sheet 3

*INVENTOR.*
BENJAMIN FOX
BY Harry Langsam
ATTORNEY

United States Patent Office 2,750,572
Patented June 12, 1956

2,750,572

MULTI-CONTACT CONNECTOR

Benjamin Fox, Philadelphia, Pa.

Application April 29, 1953, Serial No. 351,913

8 Claims. (Cl. 339—185)

My invention relates to an electrical connector, and relates more particularly to multi-terminal connectors of the plug and socket type.

This invention is an improvement over the invention disclosed in my Reissue Patent No. 23,547 granted September 9, 1952, and the present application is a continuation-in-part of my prior application Serial No. 197,269, filed November 24, 1950, now abandoned.

Heretofore, complementary, detachable plugs and sockets have been provided for establishing electrical connections between various electrical circuits, components, and equipment. In general, such plug and socket connectors are of different, fixed forms, the plugs being in the nature of male members and the sockets in the nature of female members. Therefore, in order to provide for the various needs of the electrical industry, it is necessary for the industry to manufacture and stock a large number of such separate male and female parts, since they are not interchangeable. In addition, the plug and socket connector assemblies, as heretofore constructed, are generally handled in pairs so that, if a plug or a socket fails substantially, the user must purchase both parts to obtain the one part that is needed.

Accordingly, it is an object of my present invention to provide an improved electrical connector of the plug and socket type wherein each plug and each socket is assembled from identically constructed parts, so that the stocking of different and separate plug and socket members is no longer necessary.

Another object of my present invention is to provide an improved electrical connector of the detachable plug and socket type which may be built up of any number of individual units and thus expanded to furnish any desired number of electrical contacts, and wherein the plugs and sockets are assembled of identically constructed parts.

Another object of my invention is to provide an improved electrical plug and socket connector of the quick detachable type in which the electrical contacts are polarized so that the plug and socket members interfit in only one position to insure proper electrical connections.

Another of my present invention is to provide an improved plug and socket connector which will utilize to greatest advantage the spring-action sliding contact disclosed in my prior Reissue Patent No. 23,547, to which reference has already been made.

Another object of my present invention is to provide improved, complementary plug and socket members which are easily adapted to be used as a cord connector, or for mounting on a surface, for flush mounting under a surface.

Another and most important object of my present invention is to provide an improved electrical connector of the plug and socket type of which both the plug and the socket members are constructed of a minimum number of identical, separable parts, these parts being adapted to be assembled in predetermined relation to provide either a plug member or a socket member, at will.

Another important object of my present invention is to provide an improved electrical connector such as set forth which is extremely compact in construction but which, nevertheless, is so constructed as to provide a relatively long current creepage path between the electrical contacts thereof whereby the likelihood of short circuiting or arcing across the contacts, even at relatively high voltages, is practically eliminated. This, of course, opens my improved connector to many new applications not feasible for most prior art plug and socket connectors of small size.

Another, and also very important object of my invention, is to provide an improved plug and socket electrical connector with which insulated wires or conductors may be used and which includes a built-in strain relief for such conductors as an integral part thereof, thereby eliminating the need for external or other, additional strain reliefs, as required by prior art connectors of this type.

Other objects of my invention are to provide an improved device of the character described that can be manufactured easily and economically, which can be assembled easily and quickly, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a perspective view of a four-contact electrical socket member of the quick detachable type made in accordance with my invention.

Fig. 2 is a perspective view of a four-contact plug member adapted to interfit with the socket member shown in Fig. 1, and being made of identically constructed parts as those forming the socket.

Fig. 3 is a perspective view of a two contact socket member according to my invention.

Fig. 3A is a perspective view of a plug member adapted to interfit with the socket member illustrated in Fig. 3, and being made of identically constructed parts as those forming the socket of Fig. 3.

Fig. 4 is a plan view of one of the end casing members which form part of either the socket or the plug.

Fig. 5 is a sectional, exploded view of the two terminal socket members of Fig. 3.

Fig. 6 is a plan view of the casing of Fig. 4 with two terminals in position to constitute a female or socket member.

Fig. 7 is a sectional view taken along the line 7—7 of Fig. 9.

Fig. 8 is a fragmentary plan view of the plug and socket members coupled together and with the top casing members of each removed.

Fig. 9 is a sectional view taken along line 9—9 of Fig. 7 and showing the position of one of the terminal or contact members in the casing members to provide a female or socket member.

Fig. 9A is a fragmentary side view of a portion of the plug member and showing the position of one of the contact members extending from the casing to provide a male member.

Fig. 10 is a fragmentary, sectional view taken along the line 10—10 of Fig. 8.

Figs. 12 to 16, inclusive, are diagrammatic views showing various assemblies of connectors according to my present invention.

Figure 12:
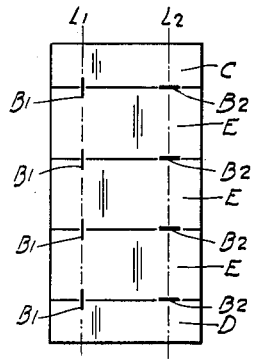
Figure 13:
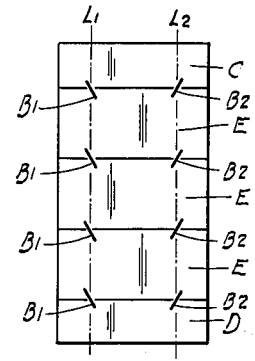
Figure 14:
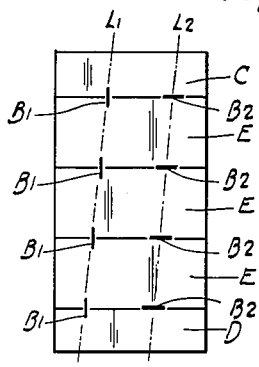
Figure 15:
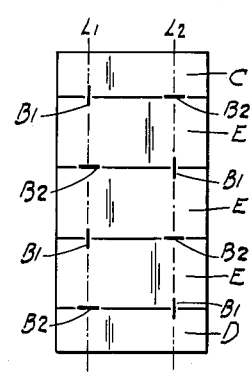
Figure 16:
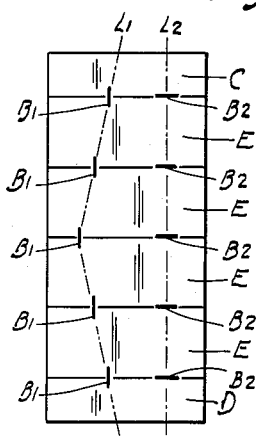
Figure 11:
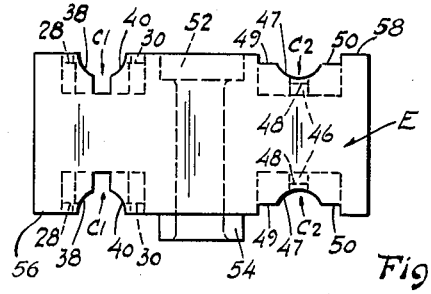
Fig. 11 is an end view of one of the intermediate casing members of my invention.
Figure 17:
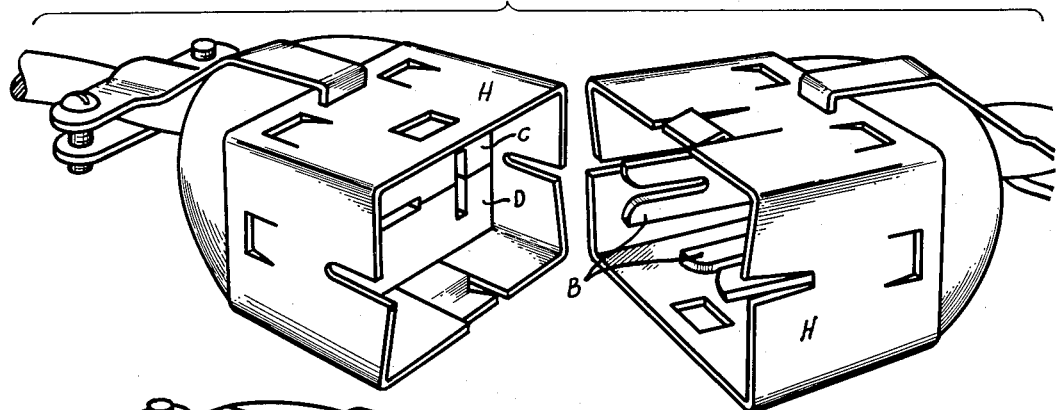

Fig. 17 is a perspective view of shielded plug and socket members according to the present invention adapted to be used as cord connectors and shown in separated relation.

Figure 18:
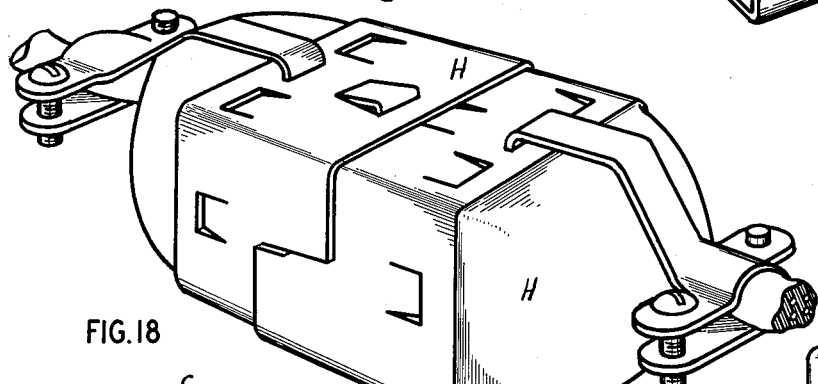

Fig. 18 is a perspective view of the plug and socket members of Fig. 17 in mated position.

Figure 19:
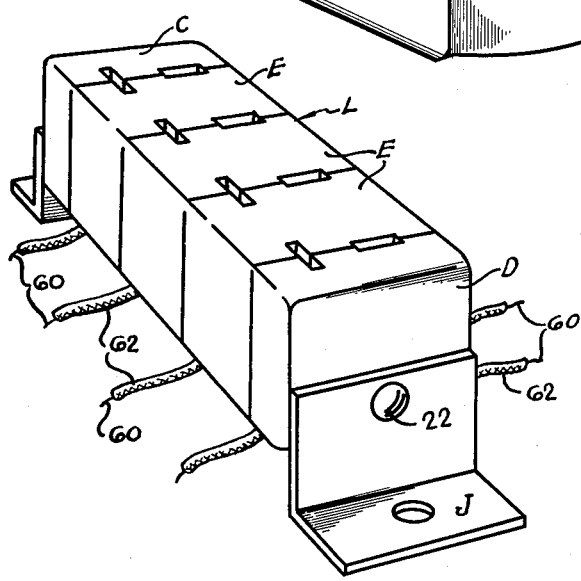

Figure 19 is a perspective view of an eight-contact socket made according to the present invention and adapted for surface mounting.

Figure 20:
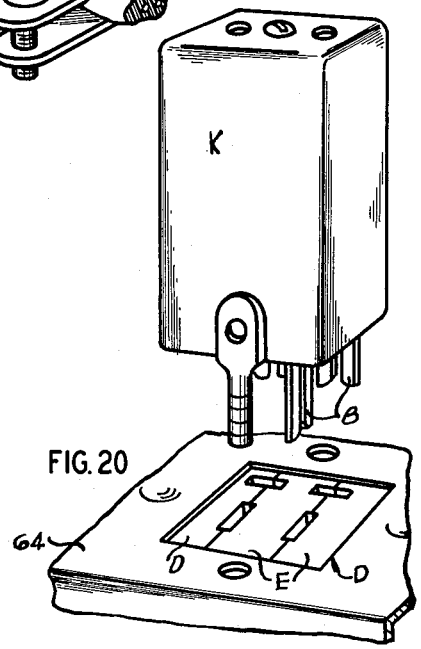

Fig. 20 is a perspective view of a four-contact socket of the present invention, mounted flush, or subsurface, together with a transformer having complementary plug contacts.

Referring, now, in greater detail to the drawings wherein similar reference characters refer to similar parts, there is shown, in Fig. 1, a four-contact socket member, generally designated as A, which is adaped to be connected to one side of an electrical circuit. The socket utilizes electrical contacts or terminals, generally designated as B, and of the type described in my previously mentioned Reissue Patent No. 23,547.

The other side of the socket A engages with one side of a complementary plug member, generally designated as A1, which also utilizes the same electrical contacts or terminals B. These electrical contacts B consist of flat members of copper or other suitable, electrically conductive material and have a terminal head 10 therein. The contacts B also have a constricted neck 12 by virtue of opposed notches 13 in the side edges thereof and a body 14 therebeyond. The body 14 of each contact B is bifurcated by virtue of a longitudinal slot 16 along the longitudinal center for approximately three quarters of the length of the contact, thereby defining two spaced prongs 18 and 20. The inner edges 21 of the prongs 18 and 20 are chamfered or beveled at a 45 degree angle to present flat contact surfaces or areas, as best seen in Fig. 10.

It should be noted that the bifurcation which defines the prongs 18, 20 of the terminal results in each prong having a limited amount of transverse resiliency, thereby providing contact members which grip each other firmly to provide firm electrical contact.

In mating position, the two mating electrical contacts B lie in perpendicular planes, as seen in Figs. 8 and 10. The prongs of one contact straddle the prongs of the other contact with the chamfered surfaces 21 of the adjacent prongs in contact with each other. The contact B is characterized by smooth sliding action and low contact resistance, is self-cleaning, and provides a large contact area. This provides good electrical contact from the instant that the contacts engage one another.

The socket member A of Fig. 1 is formed by assembling an upper end cap or casing member, generally designated as C, a lower end cap or casing member, generally designated as D, and an intermediate filler block or casing member, generally designated as E. The caps C and D are similar to each other but not quite identical, as will be pointed out more fully hereinafter. Both the caps C and D and the intermediate member E have opposed pairs of contact receiving cavities in the opposed or facing surfaces thereof which are mirror images of and are complementary to each other. The caps themselves, as in Figs. 3, 3A and 7, or the caps and the intermediate block, as in Figs. 1 and 2, are held together by a bolt 22 and a nut 23A, the bolt passing through the caps and the block or blocks E, if any, as the case may be, and the length of the bolt 22 depending on the number of caps and intermediate blocks, if any, interposed between the caps.

The caps C and D and the intermediate block E are molded from any suitable insulating material, such as "Bakelite," or any other siutable electrically non-conductive material. The insulated cap C (see Fig. 4) has a pair of laterally spaced contact receiving cavities, generally designated as C1 and C2, respectively, in one surface 23 thereof, the contacts B being held therein in separated relation to thereby prevent a short circuit of the contacts. The cap D, like the cap C, also has two contact receiving cavities C1 and C2 in the opposed surface 25 thereof, the opposed pair of cavities C1, C1 being mirror images of each other, and similarly, the opposed cavities C2, C2 being mirror images of each other (see Fig. 5). However, the cavities C1 have a different contour than the cavities C2, as will be described shortly, the cavities C1 cooperating to receive the flat contacts B in a horizontal plane at one end of the casing members and in a vertical plane at the other end thereof; and the cavities C2 co-operating to receive identical, flat contacts B in a vertical plane at the first mentioned end of the casing members and in a horizontal plane at said other end thereof. The intermediate block E is similarly provided with cavities C1 and C2, but in both of the surfaces thereof which are opposite to and engage the surfaces 23 and 25. Thus, the cavities of each of the end caps are complementary to one another (to provide the single units of Figs. 3 and 3A), and they are also complementary to the cavities in the intermediate block E (to provide the multiple units of Figs. 1 and 2).

Within the cavity C1 there is a hollow, central portion 26 bounded on the sides by flat side surfaces 28 and 30 which terminate in shoulders 31. Theses flat surfaces 28 and 30 lie in the same plane and constitute seats on which a flat contact B is mounted in a horizontal plane. There are also, two curved projections 32 and 34 at one end of the cavity C1 which extend inwardly to engage the indentations or notches 13 in the neck 12 of the contact B. The contact B may be placed on the seats 28 and 30 either with the prongs 18 and 20 thereon, as shown in Fig. 6, in which case the bifurcated end of the contact is in the civity and the terminal head 10 thereof extends out of the casing members to provide a female or socket member, or the terminal head 10 may be placed on the seats 28 and 30, as shown in the cap D of Fig. 8, in which case the bifurcated body portion 14 of the contact extends out of the casings to provide a male or plug member. In either case, the projections 32 and 34 index the location of the contact and cooperate with the notches 13 in the side edges thereof to releasably confine the contact against removal when the casing members are assembled therewith.

At the opposite end of the cavity C1 is a narrow, vertically extending recess or seat 36 defined by the curved walls 38, 40. This vertically extending recess 36 has a width equal approximately to the thickness of the contact B and serves as a seat to receive a contact B in a vertical plane or perpendicular to a cooperating, horizontal contact on the seats 28, 30. In other words, as Fig. 8 is viewed, with a contact B in socket position in one casing with its neck 12 located beside the indentations 32 and 34, an identical plug contact B can be inserted into the recess 36 to engage and interfit with the first contact in crossed relation therewith so that the two will make good electrical contact.

Within the cavity C2 of each cap C and D is a central recess 42 and at one end of the cavity C2 is a semi-circular, vertically inwardly extending projection 44 which is adapted to engage one of the contact notches 13. The contact B thus can be located in the cavity C2 in a pre-selected position either with the body portion 14 in the recess 42 and with the head 10 outside, as in the case of a socket member (see Fig. 9), or with the head in the recess 42 and the body portion 14 external to the casing, as in the case of a plug member (see Fig. 9A). At the other end of the recess 42 is a vertically extending recess 46, defined by an end portion 48 and curved side portions 47 which terminate in flat surfaces 49 and 50, the recess 46 serving to receive either of the prongs 18 or 20. The width of the recess 46 is equal substantially to the thickness of the contact B so as to hold one contact of a socket member in a vertical position (see Fig. 6). The surfaces 49 and 50 serve as seats to receive the mating, horizontal contact B of a cooperating plug member.

From the foregoing description, it should now be apparent that each casing member is adapted to receive one contact in a horizontal plane and one in a vertical plane by virtue of the forms of the two cavities C1 and C2. If the contacts are so disposed in these cavities that their body portions are within the cavities, as in Figs. 6 and 9, then the device becomes a female or socket connector. On the other hand, by merely turning the contacts 180 degrees in their respective planes, so that their heads lie within the cavities and their body portions, or bifurcated ends, extend out of the casings, as in the case of the cap D of Fig. 8 or in Fig. 9A, the connector becomes a male or plug member. Thus, the same parts can be assembled easily and quickly, at will, to provide either a plug connector or a socket connector.

The end cap C has a central, key recess 52 of any suitable shape extending over the major portion of the length thereof between the cavities C1 and C2. The end cap D is formed with a similarly shaped, outwardly projecting key 54 between its cavities C1 and C2. When the parts are assembled, the key 54 is received in the recess 52 (see Fig. 7). The recess 52 and the key 54 cooperate not only to prevent turning of the caps C and D relative to each other, but also to provide a current creepage path which is much longer than the distance between the proximate portions of the cavities C1 and C2. Because of this relatively long creepage path, the danger of a short circuit or arcing across the contacts, even at high voltages, is practically eliminated.

The intermediate casing member E has one surface to complement the contact bearing surface 23 of the end cap C and its opposite surface to complement the contact bearing surface 25 of the end cap D. In other words, one surface 56 of the intermediate member E is identical to the surface 25 of the cap D, and the other surface 58 of the intermediate member E is identical to the surface 23 of the cap C. As many of the intermediate members E may be interposed between and combined with the end caps C and D as may be desired to provide the desired number of units in a single assembly. Adjacent intermediate casing members E will, of course, interfit with each other in the same manner as they interfit with the end casing members C and D. The assembled casings may be arranged in various ways to provide for desired coupling and polarization. A few such ways are illustrated diagrammatically in Figs. 12 to 16. It will be noted that, in all of these, the contacts B, are disposed either in a common plane, as are the contacts B1 of Fig. 12, or in planes which are parallel to each other, as are the contacts B2 of Figs. 12, 13, 14, and 15. In each case, the contacts B2 are disposed in parallel planes angularly related to the plane or planes of the contacts B1, as the case may be. Moreover, the contacts B1 may be arranged along one common line L1 and the contacts B2 along another common line L2, as in Figs. 12, 13 and 14, or they may be varied as in Figs. 15 and 16. Each of the arrangements of Figs. 13–16 insures proper polarization, and although the forms shown in Figs. 14 and 16 require a larger number of different parts because of their respective arrangements of contacts, those of Figs. 1, 2, 3, 3A, 12, 13 and 15 make use of only four different parts, namely one female end cap C, one male end cap D, one or more intermediate casing members E, and the identical contacts B. Thus, only a minimum number of different parts need be carried in stock to provide any number of units as desired.

To provide external electrical connection, suitable wires or conductors 60 may be soldered to the contact heads 10. These conductors are covered with a yieldable or pliable insulating shield 62 in well known manner. When the parts are assembled to provide a male or plug member, the contact heads 10 are within their respective cavities C1 and C2 (see cap D of Fig. 8), and the conductors extend out of the casing members. As the assembly is pressed together and locked in place by the bolt 22 and nut 23A, the insulating shields become seated in the curved walls 38 and 40 of the cavities C1 and in the curved surfaces 47 of the cavities C2, and the shoulders 31 of the cavities C1, and the end portions 48 of the cavities C2 bite or dig into the insulation 62 to grip the same. This prevents strain from being applied to the conductors and the soldered connection thereof to the heads 10 in the event that pull is exerted on the conductors, whereby suitable strain relief is afforded.

By placing the plug and socket members within interfitting metal casings H (Figs. 17 and 18) of identical construction, a shielded cord connector is produced. The casings H are described in greater detail in my above identified reissue patent.

The socket may be adapted for surface mounting, or flush mounting, by attaching brackets J by means of the bolt 22 to each end of the socket member L, as shown in Fig. 19. In addition, the plug and socket combination is well suited for application to electrical components which are prone to failure. Being readily detachable, the component is easily removed from the chassis, as shown in Fig. 20. Here, a radio-frequency transformer K is adapted, by means of a plug with male contacts in the bottom thereof, to plug into a socket D mounted on the chassis 64.

It will be seen that the plug and socket is formed of standard, inexpensively produced elements, which may be combined to produce polarized plugs and sockets of any desired capacity. Furthermore, with this construction, it is even possible to repair faulty plugs or sockets simply by removing the faulty contacts or insulating pieces and replacing with interchangeable standard elements.

Although my invention has been described in considerable detail, such description is intended as being illustrative rather than limiting, since the invention may be variously embodied.

I claim as my invention:

1. An electrical coupling device comprising a pair of separable casing members having opposed pairs of complementary contact receiving cavities in the opposed surfaces thereof, the cavities in each of said casing members being laterally spaced from each other and extending from end to end thereof, the opposed cavities of each pair being mirror images of each other, one pair of said opposed cavities having seats at one end of said casing members for reception of a flat contact member in a first plane and seats at the other end of said casing members for reception of a like, flat contact member in a second plane angularly related to said first plane, and another pair of said opposed cavities having seats at said one end of said casing members for reception of a like, flat contact member in a third plane angularly related to said first plane and seats at said other end of said casing member for reception of a like, flat contact member in a fourth plane angularly related to said third plane.

2. An electrical coupling device as set forth in claim 1 wherein said seats are so arranged in their respective cavities as to dispose two of said flat contact members in a common plane and the other two of said flat contact members in planes parallel to each other and normal to said common plane.

3. An electrical coupling device comprising a pair of separable casing members having an opposed pair of complementary contact receiving cavities in the opposed surfaces thereof, the cavities in each of said casing members extending from end to end thereof, said cavities being mirror images of each other and having seats at one end of said casing members arranged to receive a flat, bifurcated contact member in a first plane with the bifurcated end thereof within said cavities, and having seats at the other end of said casing members arranged to receive a cooperating flat contact member in a plane normal to said first plane and also with the flat end thereof within said cavities whereby said contact members are adapted to be mated within said casing in crossed relation.

4. An electrical coupling device comprising a pair of separate casing members having an opposed pair of complementary contact receiving cavities in the opposed surfaces thereof, the cavities in each of said casing members extending from end to end thereof, said cavities being mirror images of each other and having seats at one end of said casing members arranged to receive a flat, bifurcated contact member in a first plane with the bifurcated end thereof within said cavities, and having seats at the other end of said casing members arranged to receive a like, flat, bifurcated contact member in a plane normal to said first plane and also with the bifurcated end thereof within said cavities whereby said contact members are adapted to be mated within said casing in crossed relation, said casing members including cooperative means adjacent said last named seats and in proximity to said other end of said casing member for gripping a yieldable insulating shield about a conductor connected to said like contact member to provide strain relief for said conductor.

5. In an electrical coupling device, the combination of separable plug and socket members, each said plug and socket member comprising a pair of separable casing members each having at least one opposed pair of complementary contact cavities, the cavities in each of said casing members extending from end to end thereof, the opposed cavities of each pair being mirror images of each other, the opposed cavities in said socket member having first seats at one end of said socket member for reception of a flat contact member in a first plane and having second seats at the other end of said socket member for reception of a like, flat contact member in a second plane normal to said first plane, a first, bifurcated, flat contact member on said first seats disposed in said first plane with the bifurcated end thereof within said socket member cavities, the opposed cavities in said plug member having third seats at one end of said plug member for reception of a like, flat contact member in said second plane, and a second bifurcated, flat contact member like said first named contact member on said third seats and disposed on said second plane with the bifurcated end thereof extending from said one end of said plug member and received in said socket member cavities in said second seats and in engagement with and in crossed relation to said first contact.

6. An electrical coupling device as set forth in claim 5 characterized by the addition of cooperative means on each said contact member and adjacent said first and third seats for confining said contact members against removal from their respective cavities.

7. An electrical coupling device as set forth in claim 5 wherein said second contact member has connected thereto a conductor having a yieldable insulating shield which extends from the other end of said plug member, and wherein said plug member cavities include means in proximity to said other end of said plug member in gripping engagement with said shield to provide strain relief for said conductor.

8. An electrical coupling device comprising a pair of separable casing members having an opposed pair of complementary contact receiving cavities in the opposed surfaces thereof, the cavities in each of said casing members extending from end to end thereof, said cavities being mirror images of each other and having seats at one end of said casing members arranged to receive a flat contact member in a first plane with the contact end thereof within said cavities, and having seats at the other end of said casing members arranged to receive a cooperating flat contact member in a plane normal to said first plane and also with the flat end thereof within said cavities whereby said contact members are adapted to be mated within said casing in crossed relation, and aligning seats for the contact end of said first flat contact member at the other end of said cavity.

References Cited in the file of this patent

UNITED STATES PATENTS

| Re. 23,547 | Fox | Sept. 9, 1952 |
| 995,674 | Hertzberg | June 20, 1911 |
| 1,518,639 | De Reamer | Dec. 9, 1924 |
| 1,747,069 | Gould | Feb. 11, 1930 |
| 1,897,829 | Watts | Feb. 14, 1933 |
| 2,046,778 | Godare | July 7, 1936 |
| 2,097,257 | Schank | Oct. 26, 1937 |
| 2,389,115 | Anderson | Nov. 20, 1945 |

FOREIGN PATENTS

| 206,011 | Switzerland | Oct. 2, 1939 |
| 355,608 | Germany | June 29, 1922 |